US012676421B2

(12) United States Patent
Suzuki et al.

(10) Patent No.: US 12,676,421 B2
(45) Date of Patent: Jul. 7, 2026

(54) INTELLIGENT REFLECTING SURFACE

(71) Applicant: Japan Display Inc., Tokyo (JP)

(72) Inventors: Daiichi Suzuki, Tokyo (JP); Shinichiro Oka, Tokyo (JP); Shigesumi Araki, Tokyo (JP); Mitsutaka Okita, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 122 days.

(21) Appl. No.: 18/624,181

(22) Filed: Apr. 2, 2024

(65) Prior Publication Data

US 2024/0243485 A1 Jul. 18, 2024

Related U.S. Application Data

(63) Continuation of application No. PCT/JP2022/030215, filed on Aug. 8, 2022.

(30) Foreign Application Priority Data

Oct. 7, 2021 (JP) ................................. 2021-165552

(51) Int. Cl.
*H01Q 15/14* (2006.01)
*G02F 1/1337* (2006.01)
(Continued)

(52) U.S. Cl.
CPC ............. *H01Q 15/148* (2013.01); *H01Q 3/36* (2013.01); *H01Q 3/46* (2013.01); *G02F 1/133757* (2021.01); *G02F 1/133784* (2013.01)

(58) Field of Classification Search
CPC .......... H01Q 15/148; H01Q 3/36; H01Q 3/46; G02F 1/133757; G02F 1/133784
See application file for complete search history.

(56) References Cited

U.S. PATENT DOCUMENTS

2007/0154657 A1* 7/2007 Sha ................... G02F 1/133753
428/1.6
2007/0296893 A1* 12/2007 Sha ................... G02F 1/133753
349/187
(Continued)

FOREIGN PATENT DOCUMENTS

JP H11-103201 A 4/1999
JP 2019-530387 A 10/2019

OTHER PUBLICATIONS

International Search Report and Written Opinion mailed on Oct. 25, 2022, received for PCT Application PCT/JP2022/030215, filed on Aug. 8, 2022, 8 pages including English Translation.

*Primary Examiner* — David Y Chung
(74) *Attorney, Agent, or Firm* — XSENSUS LLP

(57) ABSTRACT

Disclosed is a reflecting element including a first electrode, a first orientation film, a second orientation film, a liquid crystal layer, a third orientation film, a fourth orientation film, and a second electrode. The first orientation film is located over the first electrode. The second orientation film is located over and in contact with the first orientation film. The liquid crystal layer is located over the first orientation film and the second orientation film and contains liquid crystal molecules. The third orientation film is located over the liquid crystal layer. The fourth orientation film is located over and in contact with the liquid crystal layer and the third orientation film. The second electrode is located over the fourth orientation film. The first and fourth orientation films are exposed from the second and third orientation films, respectively, in a first region overlapping the first electrode.

16 Claims, 12 Drawing Sheets

(51) Int. Cl.
H01Q 3/36 (2006.01)
H01Q 3/46 (2006.01)

(56) References Cited

U.S. PATENT DOCUMENTS

2008/0143933 A1 * 6/2008 Sha ....................... G02F 1/1395
349/128
2015/0346557 A1 * 12/2015 Lee ................... G02F 1/133753
438/30
2018/0083364 A1 3/2018 Foo

* cited by examiner

150

INTELLIGENT REFLECTING SURFACE

CROSS-REFERENCE TO RELATED APPLICATIONS

This application is a Continuation of International Patent Application No. PCT/JP2022/030215, filed on Aug. 8, 2022, which claims the benefit of priority to Japanese Patent Application No. 2021-165552, filed on Oct. 7, 2021, the entire contents of each are incorporated herein by reference.

FIELD

An embodiment of the present invention relates to a reflecting element and an intelligent reflecting surface including the reflecting element.

BACKGROUND

Since liquid crystal molecules have an anisotropic dielectric constant, the dielectric constant of a liquid crystal layer can be controlled by adjusting an electric field applied to the liquid crystal layer containing liquid crystal molecules to control the orientation of the liquid crystal molecules. For example, Japanese Patent Applications No. H11-103201 and 2019-530387 disclose meta-surfaces whose characteristics can be controlled by adjusting the electric field applied to the liquid crystal layer.

SUMMARY

An embodiment of the present invention is a reflecting element. The reflecting element includes a first electrode, a first orientation film, a second orientation film, a liquid crystal layer, a third orientation film, a fourth orientation film, and a second electrode. The first orientation film is located over the first electrode. The second orientation film is located over and in contact with the first orientation film. The liquid crystal layer is located over the first orientation film and the second orientation film and contains a liquid crystal molecule. The third orientation film is located over the liquid crystal layer. The fourth orientation film is located over and in contact with the liquid crystal layer and the third orientation film. The second electrode is located over the fourth orientation film. The first orientation film and the fourth orientation film are exposed from the second orientation film and the third orientation film, respectively, in a first region overlapping the first electrode.

An embodiment of the present invention is an intelligent reflecting surface. The intelligent reflecting surface includes a plurality of reflecting elements arranged in a matrix shape. Each of the plurality of reflecting elements includes a first electrode, a first orientation film, a second orientation film, a liquid crystal layer, a third orientation film, a fourth orientation film, and a second electrode. The first orientation film is located over the first electrode. The second orientation film is located over and in contact with the first orientation film. The liquid crystal layer is located over the first orientation film and the second orientation film and contains a liquid crystal molecule. The third orientation film is located over the liquid crystal layer. The fourth orientation film is located over and in contact with the liquid crystal layer and the third orientation film. The second electrode is located over the fourth orientation film. The first orientation film and the fourth orientation film are exposed from the second orientation film and the third orientation film, respectively, in a first region overlapping the first electrode.

DESCRIPTION OF EMBODIMENTS

Hereinafter, each embodiment of the present invention is explained with reference to the drawings. The invention can be implemented in a variety of different modes within its concept and should not be interpreted only within the disclosure of the embodiments exemplified below.

The drawings may be illustrated so that the width, thickness, shape, and the like are illustrated more schematically compared with those of the actual modes in order to provide a clearer explanation. However, they are only an example, and do not limit the interpretation of the invention. In the specification and the drawings, the same reference number is provided to an element that is the same as that which appears in preceding drawings, and a detailed explanation may be omitted as appropriate.

In the specification and the claims, unless specifically stated, when a state is expressed where a structure is arranged "over" another structure, such an expression includes both a case where the substrate is arranged immediately above the "other structure" so as to be in contact with the "other structure" and a case where the structure is arranged over the "other structure" with an additional structure therebetween.

In the specification and the claims, an expression "a structure is exposed from another structure" means a mode in which a part of the structure is not covered by the other structure and includes a mode where the part uncovered by the other structure is further covered by another structure. In addition, a mode expressed by this expression includes a mode where a structure is not in contact with other structures.

First Embodiment

In the present embodiment, an intelligent reflecting surface 100 according to an embodiment of the present invention is explained. The intelligent reflecting surface 100 has a function of reflecting incident radio waves in arbitral directions. The frequencies of wavelengths which can be reflected are in the range of 400 MHz to 50 GHz, and radio waves in the 400 MHz to 6.0 GHz band, 2.5 GHz to 4.7 GHz band, and 24 GHz to 50 GHz band are typically represented.

1. Overall Structure

Figure 1:
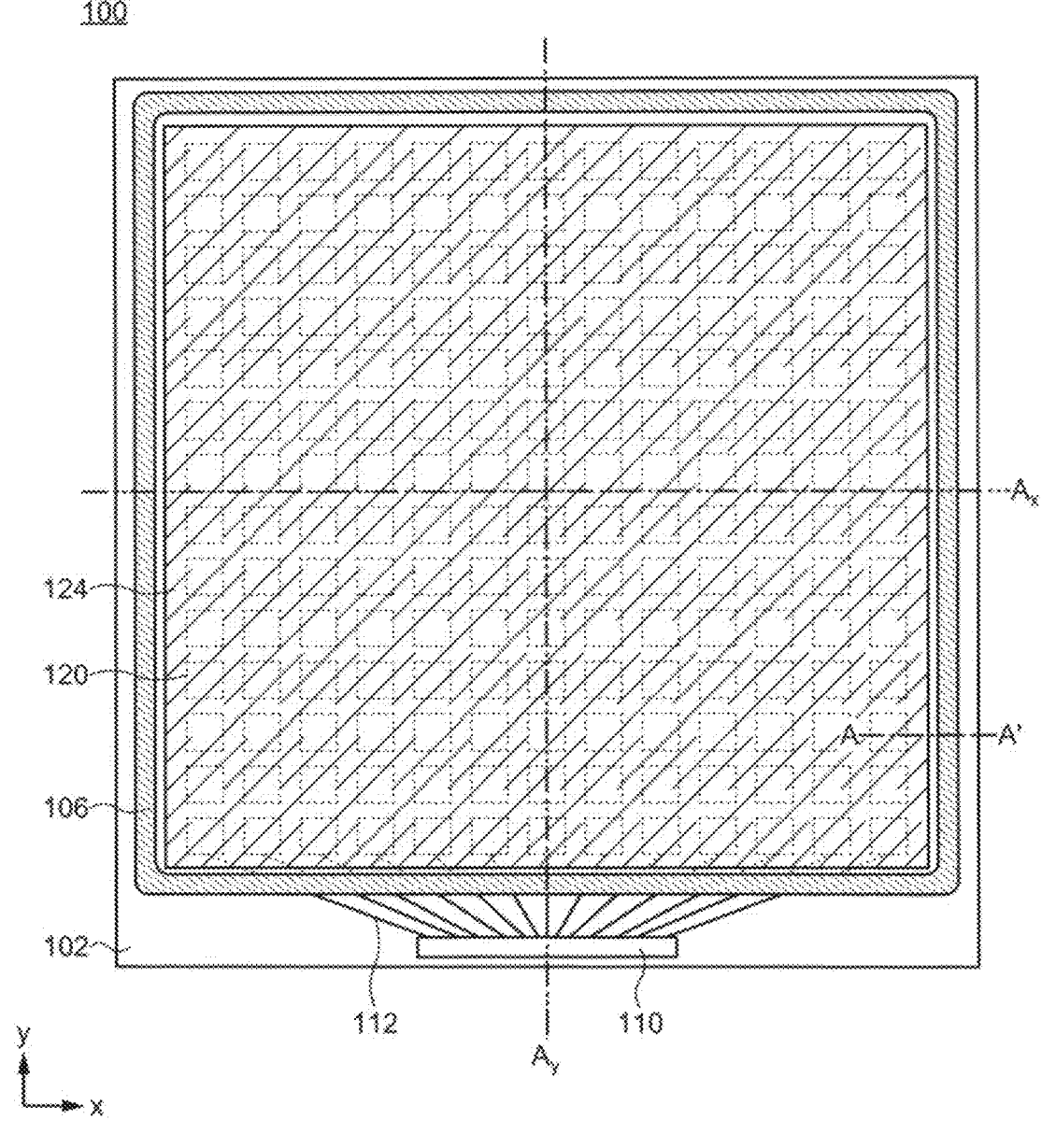
FIG. 1 is a schematic top view of an intelligent reflecting surface according to an embodiment of the present invention.

FIG. 1 shows a schematic top view of the intelligent reflecting surface 100. The intelligent reflecting surface 100 has a substrate 102 and a counter substrate 104 which is not illustrated in FIG. 1, and a plurality of reflecting elements 120 is arranged in a matrix shape between the substrate 102 and the counter substrate 104. In the example demonstrated in FIG. 1, 13 reflecting elements 120 are arranged in a row direction (x direction in the drawing), and 14 reflecting elements 120 are arranged in a column direction (y direction orthogonal to the x direction in the drawing). The number of reflecting elements 120 is not restricted and may be arbitrarily determined. The number of rows and the number of columns are also arbitrary determined and may be the same as or different from each other. The plane formed by the arrangement of the plurality of reflecting elements 120, i.e., a single plane (reflective plane) simultaneously encompassing all of the reflecting elements 120, may be square, rectangular, or circular. Preferably, the reflective plane has one or a plurality of symmetry axes passing through the reflective plane.

The substrate 102 and the counter substrate 104 are fixed to each other with a sealing material 106 containing a resin such as an epoxy resin and an acrylic resin. A liquid crystal layer 140 described below is sealed in the space formed by the substrate 102, the counter substrate 104, and the sealing material 106. Over the substrate 102, a driver circuit 110 is provided for generating a potential (control potential) for controlling the reflecting elements 120, and wirings 112 for supplying the control potential to the first electrodes 122 (described below) of the reflecting elements 120 are connected to the driver circuit 110 and the plurality of reflecting elements 120. The driver circuit 110 may be fabricated with metal films, insulating films, and semiconductor films provided over the substrate 102 or may be an IC chip having an integrated circuit fabricated over a semiconductor substrate.

1-1. Substrate

Figure 2:
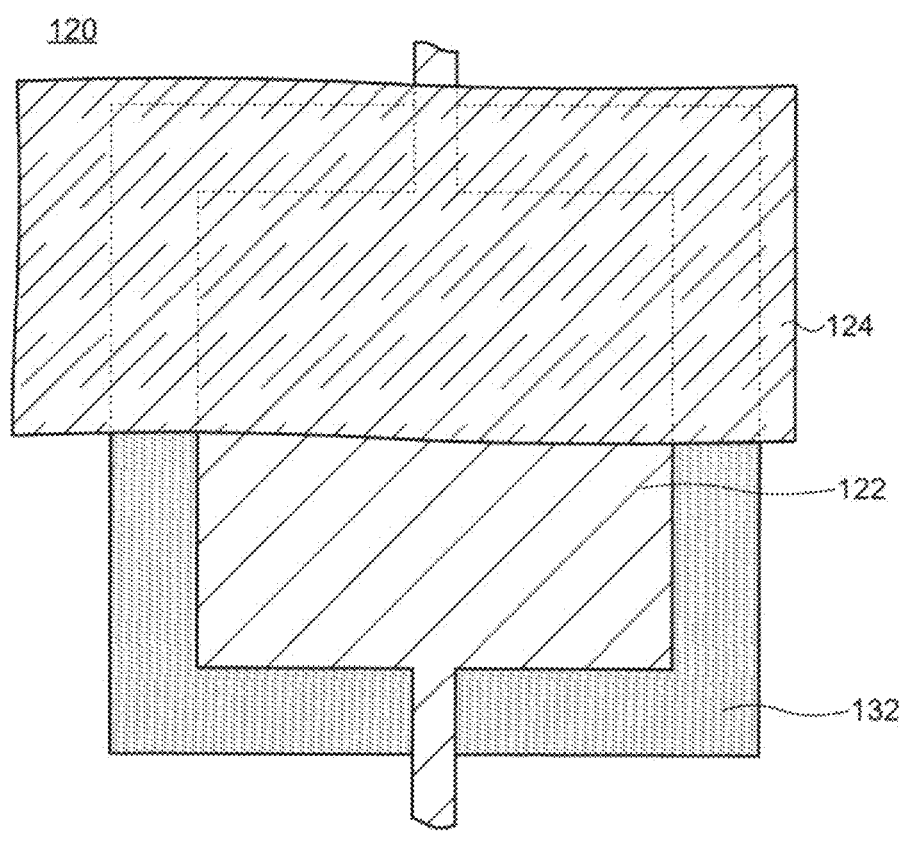
FIG. 2 is a schematic top view of a reflecting element according to an embodiment of the present invention.
Figure 3:
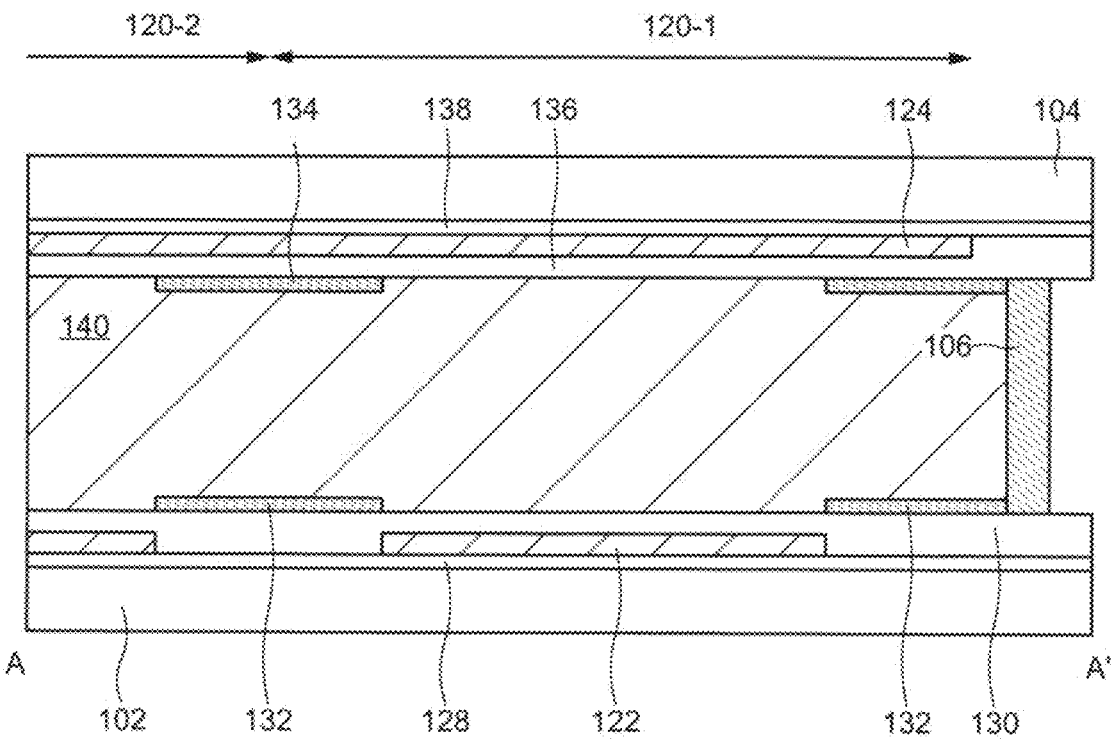
FIG. 3 is a schematic cross-sectional view of a reflecting element according to an embodiment of the present invention.

FIG. 2 shows a schematic top view of one reflecting element 120, and FIG. 3 shows a schematic view of a cross section along the chain line A-A' in FIG. 1. In FIG. 3, in addition to one reflecting element 120-1, a part of a reflecting element 120-2 adjacent to the reflecting element 120-1 and the sealing material 106 are also illustrated.

The substrate 102 and the counter substrate 104 are provided in order to provide physical strength to the intelligent reflecting surface 100 and to provide a surface for arranging the reflecting elements 120 and the driver circuit 110 for driving the reflecting elements 120. The substrate 102 and/or the counter substrate 104 may be flexible. The substrate 102 and the counter substrate 104 may include an inorganic insulator such as glass and quartz, a semiconductor such as silicon, a polymer such as a polyimide, a polycarbonate, and a polyester, or a metal such as aluminum, copper, and stainless steel. When a conductive material such as a metal is included, it is preferable to dispose a film containing an insulator such as silicon oxide and silicon nitride over the surface where the reflecting elements 120 are provided, i.e., the surface of the substrate 102 on the counter substrate 104 side and the surface of the counter substrate 104 on the substrate 102 side. At least one of the substrate 102 and the counter substrate 104 is configured to transmit at least a portion of ultraviolet light or a portion of visible light. For example, the substrate 102 and/or the counter substrate 104 is configured to transmit at least a portion of light in the wavelength range equal to or longer than 300 nm and equal to or shorter than 800 nm, preferably equal to or longer than 300 nm and equal to or shorter than 400 nm.

1-2. Reflecting Element

As shown in FIG. 2 and FIG. 3, each reflecting element 120 includes, as fundamental components, a first electrode (also called a patch electrode) 122, a second electrode 124, a first orientation film 130, a second orientation film 132, a third orientation film 134, a fourth orientation film 136, and a liquid crystal layer 140 which are sandwiched between the substrate 102 and the counter substrate 104. In view of visibility, only the first electrode 122, the second orientation film 132, and the second electrode 124 are illustrated in FIG. 2.

(1) First Electrode

The first electrode 122 is disposed over the substrate 102. The first electrode 122 may be formed over the substrate 102 through an undercoat 128 composed of one or a plurality of films including an inorganic compound such as silicon oxide and silicon nitride as an optional component. As shown in FIG. 2, the first electrodes 122 of the reflecting elements 120 adjacent to each other in the row direction or the column direction are electrically connected to and are conductive with each other in the intelligent reflecting surface 100. Thus, although the first electrodes 122 of the plurality of reflecting elements 120 disposed in one column are conductive and equipotential with each other, for example, these first electrodes 122 are not conductive with the first electrodes 122 of the reflecting elements 120 disposed in other columns in this case. Similarly, when the first electrodes 122 of the plurality of reflecting elements 120 disposed in one row are conductive with each other so as to be equipotential, these first electrodes 122 are not conductive with the first electrodes 122 of the reflecting elements 120 disposed in other rows.

The first electrode 122 includes, for example, a metal such as copper, aluminum, tungsten, molybdenum, and titanium, an alloy containing at least one of these metals, or a conductive oxide such as indium-tin oxide (ITO) and indium-zinc oxide (IZO). The first electrode 122 may have a single-layer structure or a stacked-layer structure in which layers of different compositions are stacked. The first electrode 122 may be formed by applying a sputtering method, a chemical vapor deposition (CVD) method, or the like.

Here, the first electrode 122 does not occupy the entire surface occupied by one reflecting element 120 over the substrate 102 but occupies a portion thereof. Thus, in the examples shown in FIG. 2 and FIG. 3, a part of the surface occupied by each reflecting element 120 and including the center of the surface is occupied by the first electrode 122, and the second orientation film 132 and the third orientation film 134 described below are arranged in another region.

(2) First Orientation Film

The first orientation film 130 is provided in order to control the orientation of the liquid crystal molecules forming the liquid crystal layer 140 provided thereover. The first orientation film 130 is disposed over the first electrode 122 and covers the first electrode 122. The first orientation film 130 is continuously provided over the plurality of reflecting elements 120. In other words, the first orientation film 130 is not divided between adjacent reflecting elements 120 and is shared by all of the reflecting elements 120. The first orientation film 130 includes a polymer such as a polyimide and a polyester. The first orientation film 130 is fabricated by utilizing wet deposition methods such as an ink-jet method, a spin-coating method, a printing method, and a dip-coating method, and its surface is subjected to a rubbing process.

(3) Second Orientation Film

The second orientation film 132 is also provided in order to control the orientation of the liquid crystal molecules. The second orientation film 132 includes a polymer having a composition different from that of the first orientation film 130. Specifically, the second orientation film 132 includes a linear or cross-linked polymer having side chains exhibiting liquid crystalline properties. There is no restriction on the structure of such polymers. For example, as the fundamental skeleton of the polymer structuring the second orientation film 132, a poly(meth)acrylate, polyoxyethylene, a polyester, a polysilane, a polyamide, a polyurethane, a polysiloxane, and the like are represented. The side chains contain rigid substituents (mesogens) and also contain spacers connecting the rigid substituents to the main chain. The side chain may also contain a terminal group bonded to the rigid substituent without being bonded to the main chain. As the rigid substituents, an aromatic substituent in which a plurality of aromatic rings is directly attached, such as a biphenyl group, an aromatic imino group, an azobenzene group, an aromatic ester, a stilbene group, a diarylacetylene, and the like are represented. The spacer includes an alkyl group, an alkoxy group, an ester group, and the like. As the terminal group, an alkyl group, an alkoxy group, an alkyl ester group, a cyano group, and the like are represented. The method of fabricating the second orientation film 132 will be described later.

The second orientation film 132 is provided so as not to overlap the first electrode 122. That is, the second orientation film 132 does not overlap or does not substantially overlap the first electrode 122 in the direction perpendicular to the top surface of the substrate 102. Therefore, the first orientation film 130 is exposed from the second orientation film 132 and is in direct contact with the liquid crystal layer 140 in the region overlapping the first electrode 122. On the other hand, the second orientation film 132 is in direct contact with the liquid crystal layer 140 in the region other than the aforementioned region and is sandwiched between the first orientation film 130 and the liquid crystal layer 140. In other words, the second orientation film 132 has a plurality of openings each overlapping the first electrode 122. The second orientation film 132 may be continuous over the adjacent reflecting elements 120 (FIG. 3). That is, the second orientation film 132 may be shared by the plurality of reflecting elements 120.

The second orientation film 132 is configured so that the longitudinal axis of the liquid crystal molecules overlapping the second orientation film 132 is tilted from the top surface of the substrate 102, and the tilt angle thereof is larger than that of the region in direct contact with the first orientation film 130 (i.e., the region overlapping the first electrode 122).

(4) Liquid Crystal Layer

The liquid crystal layer 140 contains the liquid crystal molecules. The structure of the liquid crystal molecules is not limited. Thus, the liquid crystal molecules may be nematic liquid crystals, smectic liquid crystals, cholesteric liquid crystals, or chiral smectic liquid crystals.

The liquid crystal layer 140 is in direct contact with the second orientation film 132 and directly contacts the first orientation film 130 in the region overlapping the first electrode 122. The thickness of the liquid crystal layer 140 is, for example, equal to or larger than 20 μm and equal to or less than 100 μm or equal to or larger than 30 μm and equal to or less than 50 μm. Accordingly, the height of the sealing material 106 is also selected from this range. Although not illustrated, a spacer may be provided in the liquid crystal layer 140 to maintain this thickness throughout the entire intelligent reflecting surface 100. If the aforementioned thickness of the liquid crystal layer 140 is employed in a liquid crystal display device, the high responsiveness required to display moving images cannot be obtained, and it becomes significantly difficult to express the functions of a liquid crystal display device.

(5) Third Orientation Film

Similar to the second orientation film 132, the third orientation film 134 is also provided in order to control the orientation of the liquid crystal molecules and has the same composition and structure as the second orientation film 132. The third orientation film 134 overlaps the second orientation film 132 but does not overlap or does not substantially overlap the first electrode 122. In other words, the third orientation film 134 is in direct contact with the liquid crystal layer 140 in the region other than the region overlapping the first electrode 122. Similar to the second orientation film 132, the third orientation film 134 also has an opening overlapping the first electrode 122. Accordingly, the second orientation film 132 and the third orientation film 134 each have an opening so that the openings overlap each other. The shapes of the openings in the second orientation film 132 and the third orientation film 134 may be the same as or different from each other. The third orientation film 134 may also be continuous over adjacent reflecting elements 120 (FIG. 3). That is, the third orientation film 134 may also be shared by the plurality of reflecting elements 120.

As described above, since the third orientation film 134 has the same configuration as the second orientation film 132, its contribution to the tilt of the liquid crystal molecules is also the same. Therefore, the tilt angle of the liquid crystal molecules located over the third orientation film 134, i.e., the liquid crystal molecules overlapping the third orientation film 134, is larger than that of the region in direct contact with the first orientation film 130 and the fourth orientation film 136 (i.e., the region overlapping the first electrode 122).

(6) Fourth Orientation Film

The fourth orientation film 136 has the same function as the first orientation film 130 and orients the liquid crystal molecules. The fourth orientation film 136 has the same composition and structure as the first orientation film 130, and the rubbing direction is also the same. The fourth orientation film 136 overlaps the first electrode 122 and the second electrode 124 and is continuously formed over the plurality of reflecting elements 120. The fourth orientation film 136 does not overlap the second orientation film 132 or the fourth orientation film 136 in the region overlapping the first electrode 122. In other words, the fourth orientation film 136 is exposed from the third orientation film 134 and is in direct contact with the liquid crystal layer 140 in the region overlapping the first electrode 122. On the other hand, the third orientation film 134 is in direct contact with the liquid crystal layer 140 in the region other than this region and is sandwiched between the fourth orientation film 136 and the liquid crystal layer 140.

(7) Second Electrode

The second electrode 124 is provided over the counter substrate 104 (under the counter substrate 104 in FIG. 3). The second electrode 124 may be formed over the substrate 102 via an overcoat 138 composed of one or a plurality of films including an inorganic compound such as silicon oxide and silicon nitride as an optional component. In the examples shown in FIG. 2 and FIG. 3, the second electrode 124 is provided over all of the reflecting elements 120. That is, the second electrode 124 is shared by all of the reflecting elements 120. The second electrode 124 is supplied with a constant potential from an external circuit via wiring which is not illustrated.

Similar to the first electrode 122, the second electrode 124 may also contain a metal such as copper, aluminum, tungsten, molybdenum, and titanium, an alloy containing at least one of these metals, or a conductive oxide such as indium-tin oxide (ITO) and indium-zinc oxide (IZO), for example. The second electrode 124 may also have a single-layer structure or a stacked-layer structure having layers of different compositions. The second electrode 124 may also be formed by applying a sputtering method, a chemical vapor deposition (CVD) method, or the like.

2. Manufacturing Method of Intelligent Reflecting Surface

Figure 4A:
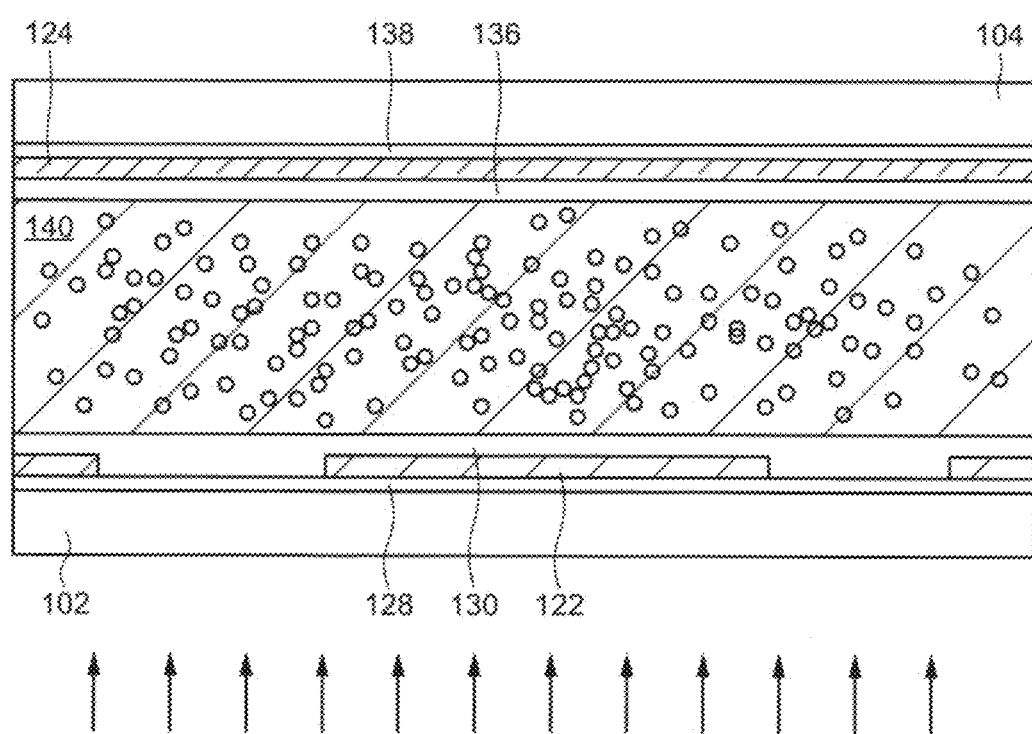
FIG. 4A is a schematic cross-sectional view of a reflecting element according to an embodiment of the present invention.
Figure 4B:
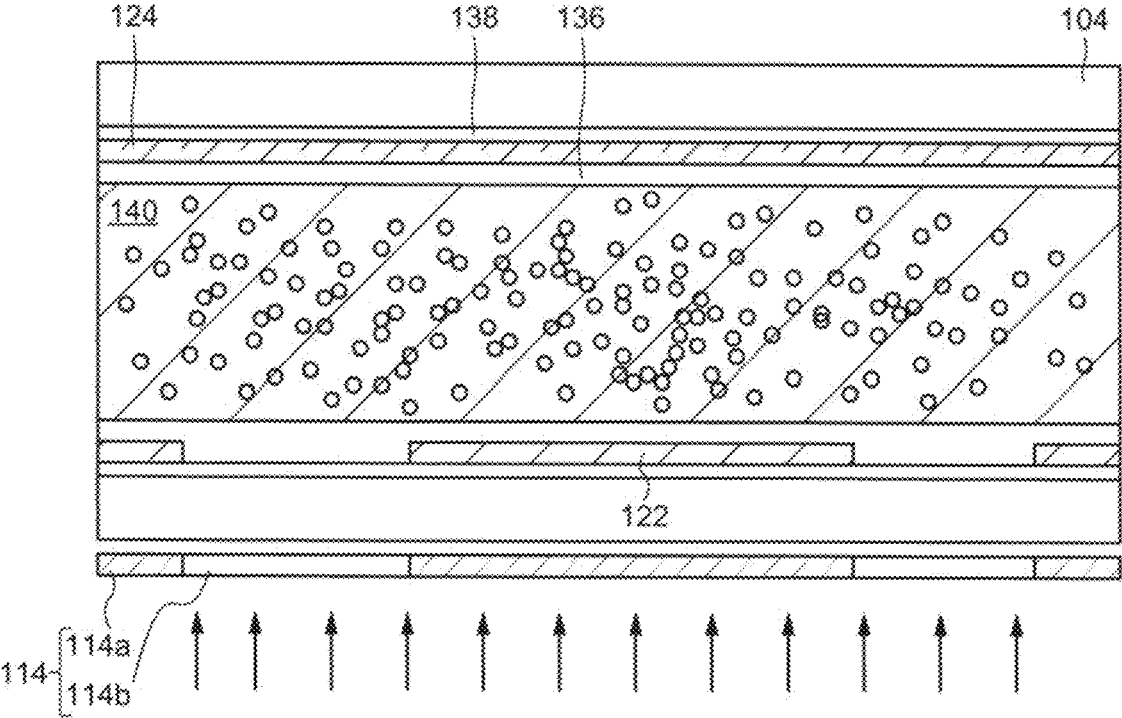
FIG. 4B is a schematic cross-sectional view of a reflecting element according to an embodiment of the present invention.

A manufacturing method of the intelligent reflecting surface 100 is explained using the cross-sectional views shown in FIG. 4A and FIG. 4B. In these drawings, three consecutive reflecting elements 120 are demonstrated. Similar to known liquid crystal displays, the first electrode 122 and the first orientation film 130 are sequentially formed over the substrate 102. Meanwhile, the second electrode 124 and the fourth orientation film 136 are formed over the counter substrate 104. The first orientation film 130 and the fourth orientation film 136 are subjected to a rubbing process.

Thereafter, the substrate 102 and the counter substrate 104 are arranged so that the rubbing directions of the first orientation film 130 and the fourth orientation film 136 are the same, and the first orientation film 130 and the fourth orientation film 136 are sandwiched between the substrate 102 and the counter substrate 104, and the substrate 102 and the counter substrate 104 are then bonded using the sealing material 106. The liquid crystal layer 140 is then injected into the space enclosed by the substrate 102, the counter substrate 104, and the sealing material 106. Alternatively, a pre-cured or partially cured sealing material 106 may be applied over one of the substrate 102 and the counter substrate 104, and the liquid crystal layer 140 may be dropped onto the region surrounded by the sealing material 106. The other of the substrate 102 and the counter substrate 104 is then placed over the sealing material 106, and the sealing material 106 is cured.

At this time, the liquid crystal layer 140 contains reactive mesogens (indicated by circular symbols in the drawing) and photo-initiators (not illustrated) as shown in FIG. 4A. The reactive mesogens are molecules having a polymerizable substituent and a rigid substituent in the same molecule via a spacer, and polymerization results in a linear or cross-linked polymer with a rigid substituent on the side chain. The reactive mesogens may also be oligomers. The photo-initiators are molecules which absorb ultraviolet or visible light to generate cationic species or radicals, and known photo-initiators may be used.

Light is applied from the first electrode 122 side while the substrate 102 and the counter substrate 104 sandwiching the liquid crystal layer 140 are bonded to each other (see the arrows in FIG. 4A). The applied light (irradiation light) includes the light with a wavelength to be absorbed by the photo-initiator. In the case where the first electrode 122 does not transmit the irradiation light, the irradiation light is partially shielded by the first electrode 122 while being selectively absorbed by the photo-initiator in the region where the first electrode 122 is not provided, allowing the polymerization and/or the cross-linking of the reactive mesogens. As a result, the second orientation film 132 and the third orientation film 134 are selectively formed over the first orientation film 130 and the fourth orientation film 136, respectively, in the region where the first electrode 122 is not provided (see FIG. 3).

In the case where the first electrode 122 transmits the irradiation light, the light irradiation may be performed through a photomask 114 having a light-transmitting portion 114b and a light-shielding portion 114a (FIG. 4B). The photomask 114 is configured so that the light-transmitting portion 114b overlaps the first electrode 122 while the light-shielding portion 114a does not overlap the first electrode 122. When the second electrode 124 transmits the irradiation light, the light irradiation may be performed from the second electrode 124 side through the photomask 114.

As described above, the first orientation film 130 and the fourth orientation film 136 are subjected to a rubbing process. Therefore, the rigid substituents of the reactive mesogens in the liquid crystal layer 140 are oriented in a certain direction between the first orientation film 130 and the fourth orientation film 136 before the polymerization or cross-linking, and the polymerization or cross-linking can be performed by the light irradiation while maintaining this state. Therefore, the polymer formed by cross-linking the reactive mesogens is able to fix the liquid crystal molecules at a large tilt angle (pre-tilt angle) at a vicinity of the interface between the second orientation film 132 and the liquid crystal layer 140 and at a vicinity of the interface between the third orientation film 134 and the liquid crystal layer 140. Hence, the second orientation film 132 and the third orientation film 134 have a higher ability to tilt the liquid crystal molecules than the first orientation film 130 and the fourth orientation film 136. As a result, in the region sandwiched between the second orientation film 132 and the third orientation film 134, the pre-tilt angle of the liquid crystal molecules in the absence of an electric field is larger than that in other regions. Hereinafter, within the liquid crystal layer 140, the region sandwiched between the second orientation film 132 and the third orientation film 134 is referred to as a high pre-tilt region, while the region which is not sandwiched between the second orientation film 132 and the third orientation film 134 and which is in direct contact with the first orientation film 130 and the second orientation film 132 (that is, the region occupied by the first electrode 122 in the reflecting element 120 and overlapping the first electrode 122) is referred to as a low pre-tilt region. In an embodiment of the present invention, it is possible to separately prepare the high pre-tilt region and the low pre-tilt region in each reflecting element 120 by selectively polymerizing or crosslinking the reactive mesogens in each reflecting element 120.

3. Operation

Figure 5A:
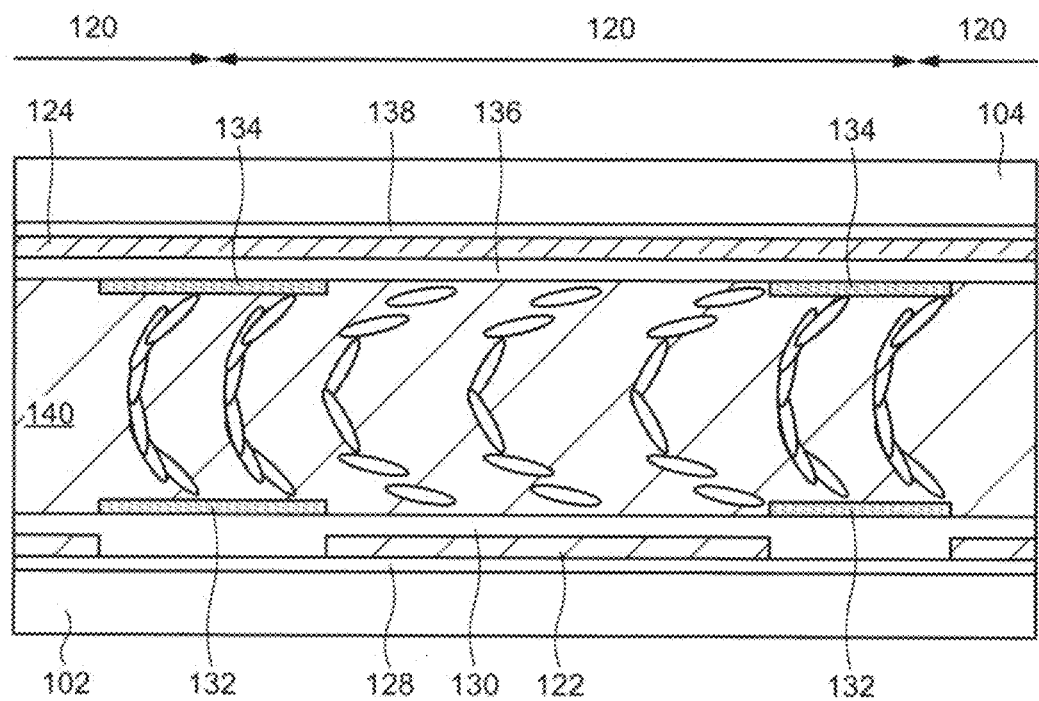
FIG. 5A is a schematic cross-sectional view showing a manufacturing method of a reflecting element according to an embodiment of the present invention.
Figure 5B:
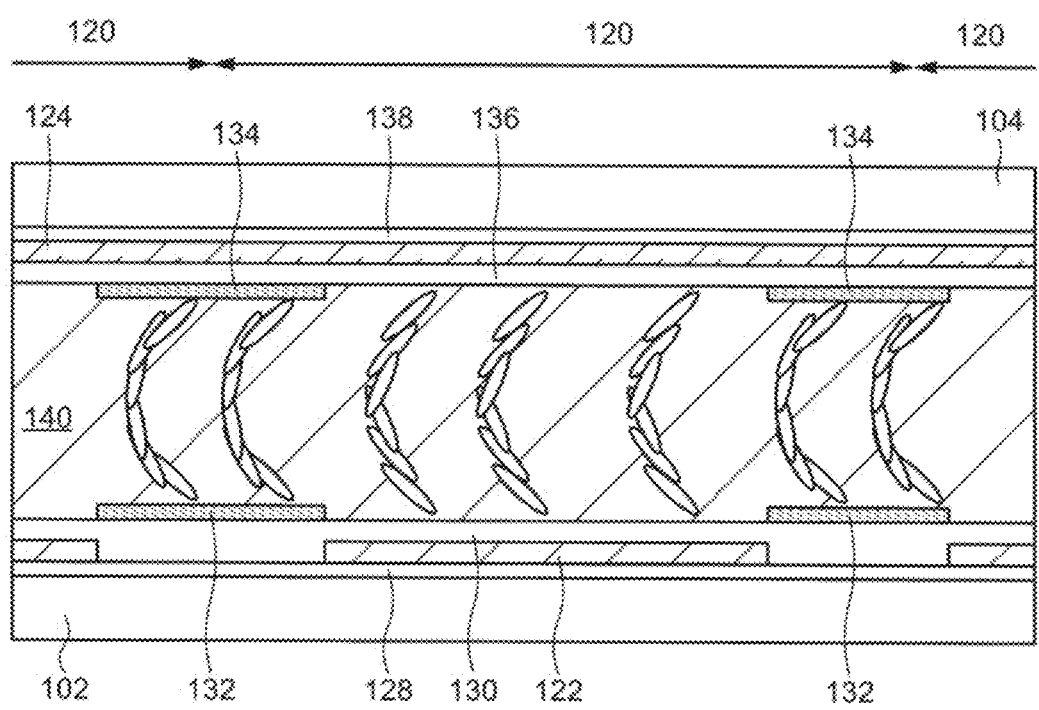
FIG. 5B is a schematic cross-sectional view showing a manufacturing method of a reflecting element according to an embodiment of the present invention.

The operation of the intelligent reflecting surface 100 is described using the schematic cross-sectional views shown in FIG. 5A and FIG. 5B. In these drawings, three consecutive reflecting elements 120 are illustrated.

As described above, each reflecting element 120 has the high pre-tilt region and the low pre-tilt region. In the low pre-tilt region, the liquid crystal molecules tend to have a splay orientation in the absence of an electric field because the rubbing directions of the first orientation film 130 and the fourth orientation film 136 are the same. On the other hand, when the control potential is appropriately varied to provide a potential difference between the first electrode 122 and the second electrode and 124, an electric field is generated in the liquid crystal layer 140, which causes the liquid crystal molecules to rotate, resulting in a transition from the splay orientation to a bent orientation. Therefore, the dielectric constant of the liquid crystal layer 140 can be significantly changed in each reflecting element 120 by appropriately adjusting the control potential.

Since the transition from the splay orientation to the bent orientation is generally slow, the time required for dielectric constant change (response time) is long. However, each reflecting element 120 has the high pre-tilt region. In the high pre-tilt region, the contribution of the second orientation film 132 and the third orientation film 134 allows the liquid crystal molecules to significantly tilt and have a strongly bent-oriented state even in the absence of an electric field. That is, the average tilt angle is large. Moreover, since the first electrode 122 does not exist in the high pre-tilt region, no electric field is generated in this high pre-tilt region even if a potential difference is provided between the first electrode 122 and the second electrode 124. Therefore, this bent orientation is independent from the magnitude of the electric field. In other words, a strong bent orientation exists stably in the high pre-tilt region.

As a result, the low pre-tilt region is affected by the orientation of the adjacent high pre-tilt region and can have a relatively high tilt angle even in the absence of an electric field as shown in FIG. 5A. Specifically, the average tilt angle of liquid crystal molecules in the low pre-tilt region is smaller than that in the high pre-tilt region in the absence of an electric field but is larger than that in the case where there is no high pre-tilt region. That is, the liquid crystal molecules can have a pseudo bent orientation in the low pre-tilt region even in the absence of an electric field. When an electric field is applied to the liquid crystal layer 140 in this state, the pseudo-bent-oriented liquid crystal molecules in the low pre-tilt region responds at high speed and transitions to the bent orientation (FIG. 5B). Therefore, a large response speed can be obtained.

Figure 6A:
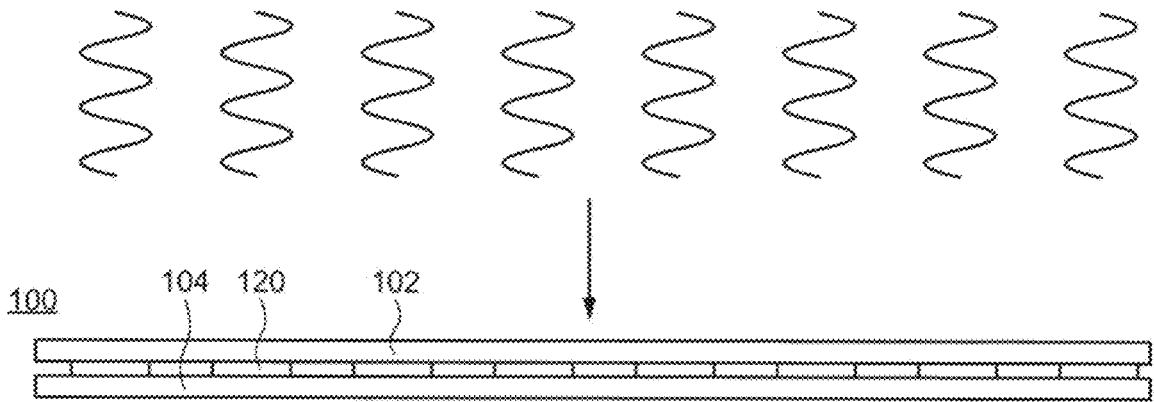
FIG. 6A is a schematic diagram showing the characteristics of an intelligent reflecting surface according to an embodiment of the present invention.
Figure 6B:
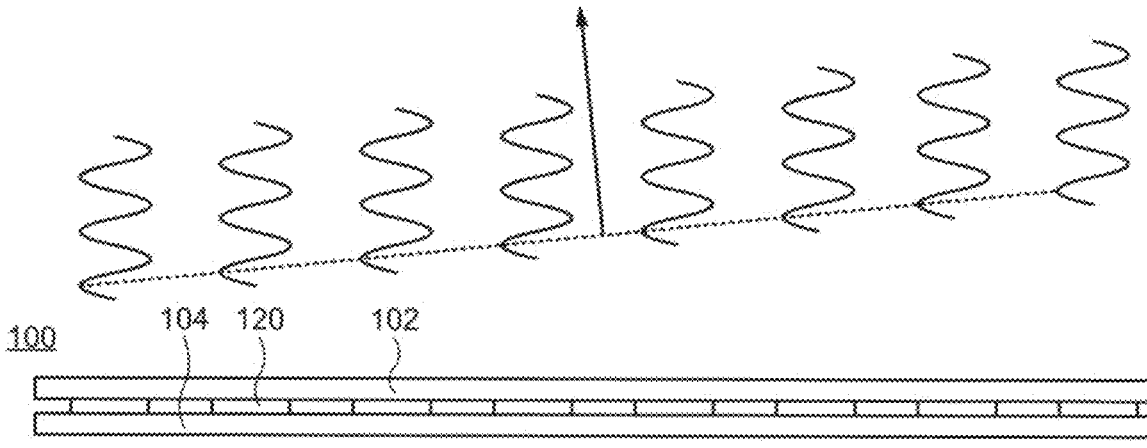
FIG. 6B is a schematic diagram showing the characteristics of an intelligent reflecting surface according to an embodiment of the present invention.

Therefore, the intelligent reflecting surface 100 including the reflecting elements 120 having the aforementioned configuration is able to function as an intelligent reflecting surface capable of switching the reflection direction of radio waves. For example, assume a situation where the intelligent reflecting surface 100 is irradiated with radio waves (wavy lines in the drawing) as shown in FIG. 6A. At this time, a constant potential is provided to the second electrode 124. On the other hand, individual control potentials are provided to the first electrodes 122 for each column or row from the driver circuit 110. As a result, the tilt angle of the liquid crystal molecules in the liquid crystal layer 140 changes for each column or row, and accordingly, the dielectric constant of the liquid crystal layer 140 changes for each column or row. When the dielectric constant changes, the amount of change in the phase of the reflected radio waves changes. Thus, the phase of the reflected radio waves from the intelligent reflecting surface 100 also shifts column by column or row by row. As a result, the travel direction of the radio waves changes. That is, it is possible to reflect the radio waves at a reflection angle different from the incident angle of the radio waves. For example, in the examples shown in FIG. 6A and FIG. 6B, the incident angle of the radio wave is 0°, while the reflection angle is greater than 0°.

The reflection angle can be arbitrarily controlled because the amount of phase change can be varied by controlling the control potential applied to the first electrodes 122. Specifically, when the first electrodes 122 of the reflecting elements 120 adjacent in the column direction (y direction in FIG. 1) are equipotential, the intelligent reflecting surface 100 is able to function as a uniaxial intelligent reflecting surface having a reflection axis $A_y$ extending in the column direction. Conversely, when the first electrodes 122 of the reflecting elements 120 adjacent in the row direction (x direction in FIG. 1) are equipotential, the intelligent reflecting surface 100 is able to function as a uniaxial intelligent reflecting surface having a reflection axis $A_x$ extending in the row direction.

As described above, each reflecting element 120 is provided with the high pre-tilt region and the low pre-tilt region in the intelligent reflecting surface 100 according to an embodiment of the present invention. Although the high pre-tilt region does not contribute to the dielectric constant control of the liquid crystal layer 140, the high pre-tilt region is able to cause the liquid crystal layer 140 in the low pre-tilt region, which contributes to the dielectric constant control, to be pseudo-bent oriented in the absence of an electric field, enabling the liquid crystal layer 140 in the low pre-tilt region to be bent-oriented at a large response speed. This mechanism allows the intelligent reflecting surface 100 to function as an intelligent reflecting surface with a large response speed.

4. Modified Examples

Figure 7A:
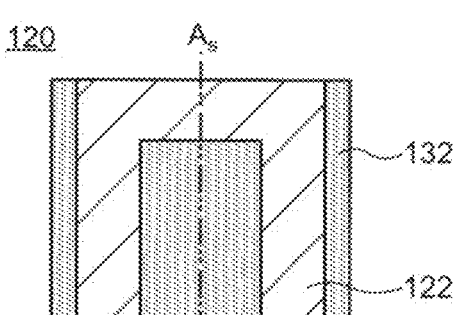
FIG. 7A is a schematic top view of a reflecting element according to an embodiment of the present invention.
Figure 7B:
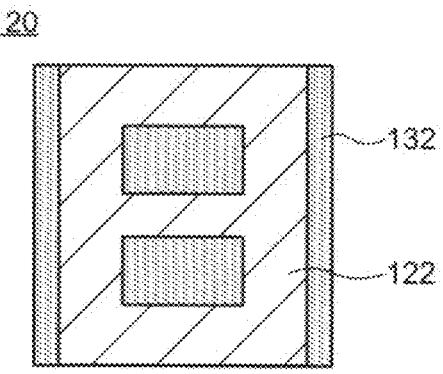
FIG. 7B is a schematic top view of a reflecting element according to an embodiment of the present invention.
Figure 7C:
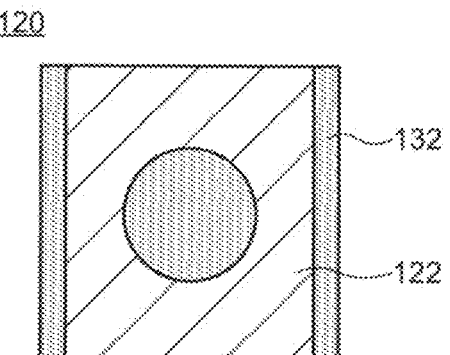
FIG. 7C is a schematic top view of a reflecting element according to an embodiment of the present invention.
Figure 7D:
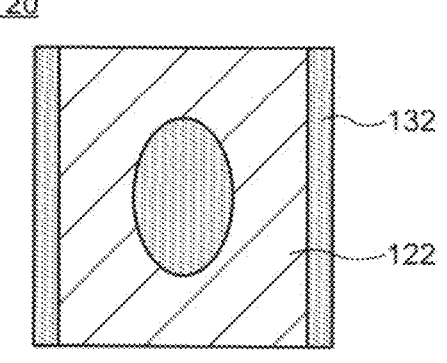
FIG. 7D is a schematic top view of a reflecting element according to an embodiment of the present invention.

There is no restriction on the plane shape of the first electrode 122 (shape on a plane parallel to the substrate 102), and the plane shape may have no openings as shown in FIG. 2 or may have one or a plurality of openings (or slits) as shown in FIG. 7A and FIG. 7B. That is, the first electrode 122 may have a ring shape in each reflecting element 120. The shape of the opening may be a polygon including a square and a rectangle, and the profile of the opening may be composed of a curve. Specifically, the opening may be a circle (FIG. 7A) or an ellipse (FIG. 7D). Preferably, the first electrode 122 has a symmetry axis $A_s$ parallel to the reflection axis of the intelligent reflecting surface 100.

The shape of the second electrode 124 is also arbitrary and may be continuous over the entire reflective plane without any opening (see FIG. 1 and FIG. 3).

Figure 8:
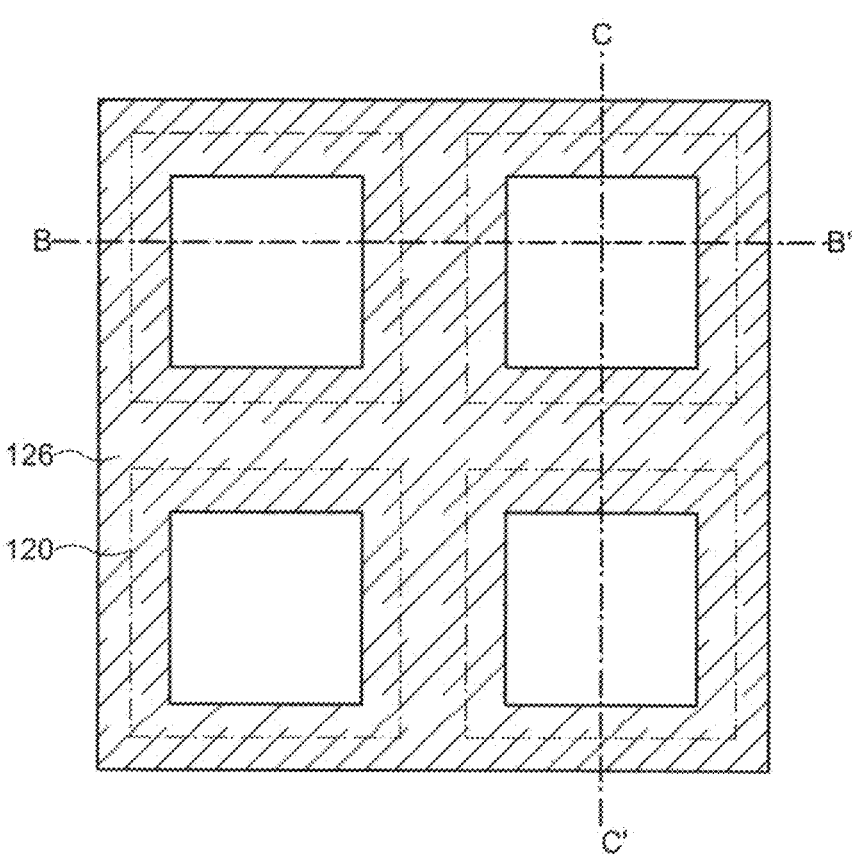
FIG. 8 is a schematic top view of a reflecting element according to an embodiment of the present invention.
Figure 9A:
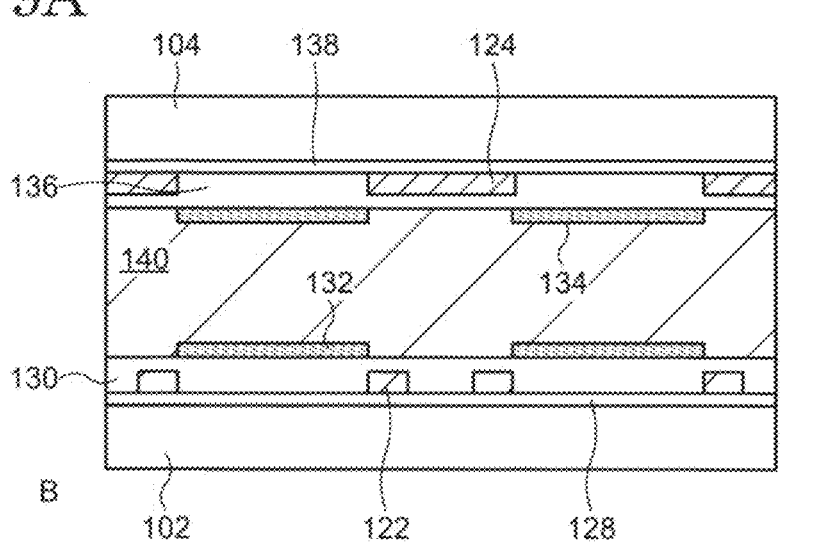
FIG. 9A is a schematic cross-sectional view of a reflecting element according to an embodiment of the present invention.
Figure 9B:
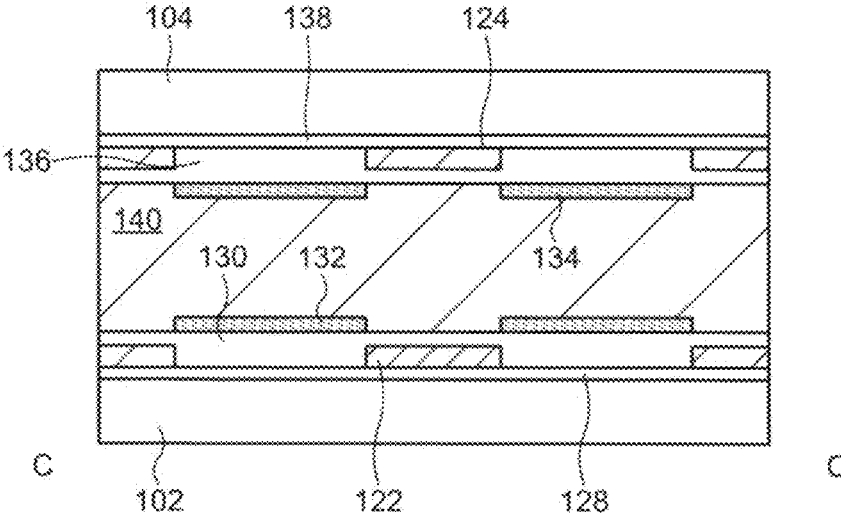
FIG. 9B is a schematic cross-sectional view of a reflecting element according to an embodiment of the present invention.

Alternatively, as shown in FIG. 8, which is a schematic top view of four reflecting elements 120, and schematic views (FIG. 9A and FIG. 9B) of cross sections along the chain lines B-B' and C-C' in FIG. 8, the second electrode 124 may have an opening overlapping at least a portion of the opening of the first electrode 122 when the first electrode 122 has an opening (see FIG. 7A to FIG. 7D). The opening of the second electrode 124 may overlap the entire opening of the first electrode 122. Similar to the first electrode 122, the shape of the opening of the second electrode 124 may be arbitrarily set, may be a polygon including a square and a rectangle, or may be a circle or an ellipse in which the profile is partly or entirely composed of a curve. The shape of the opening of the second electrode 124 may be the same as or different from the opening of the first electrode 122. The second orientation film 132 and the third orientation film 134 are arranged so as not to overlap the first electrode 122 nor the second electrode 124.

In the above-mentioned modified example, the low pre-tilt region which does not overlap the second orientation film 132 nor the third orientation film 134 but overlaps the first electrode 122 is formed in addition to the high pre-tilt region overlapping the second orientation film 132 and the third orientation film 134 in each reflecting element 120. Therefore, the high pre-tilt region allows the liquid crystal molecules in the low pre-tilt region to have a pseudo bent orientation. Hence, the liquid crystal layer 140 in the low pre-tilt region responds to the electric field at a high speed and transitions to the bent orientation, leading to the formation of a large change in dielectric constant anisotropy in each of the reflecting elements 120.

Second Embodiment

In this embodiment, an intelligent reflecting surface 150 different in structure from the intelligent reflecting surface 100 described in the First Embodiment is explained. An explanation of the structures the same as or similar to those described in the First Embodiment may be omitted.

Figure 10:
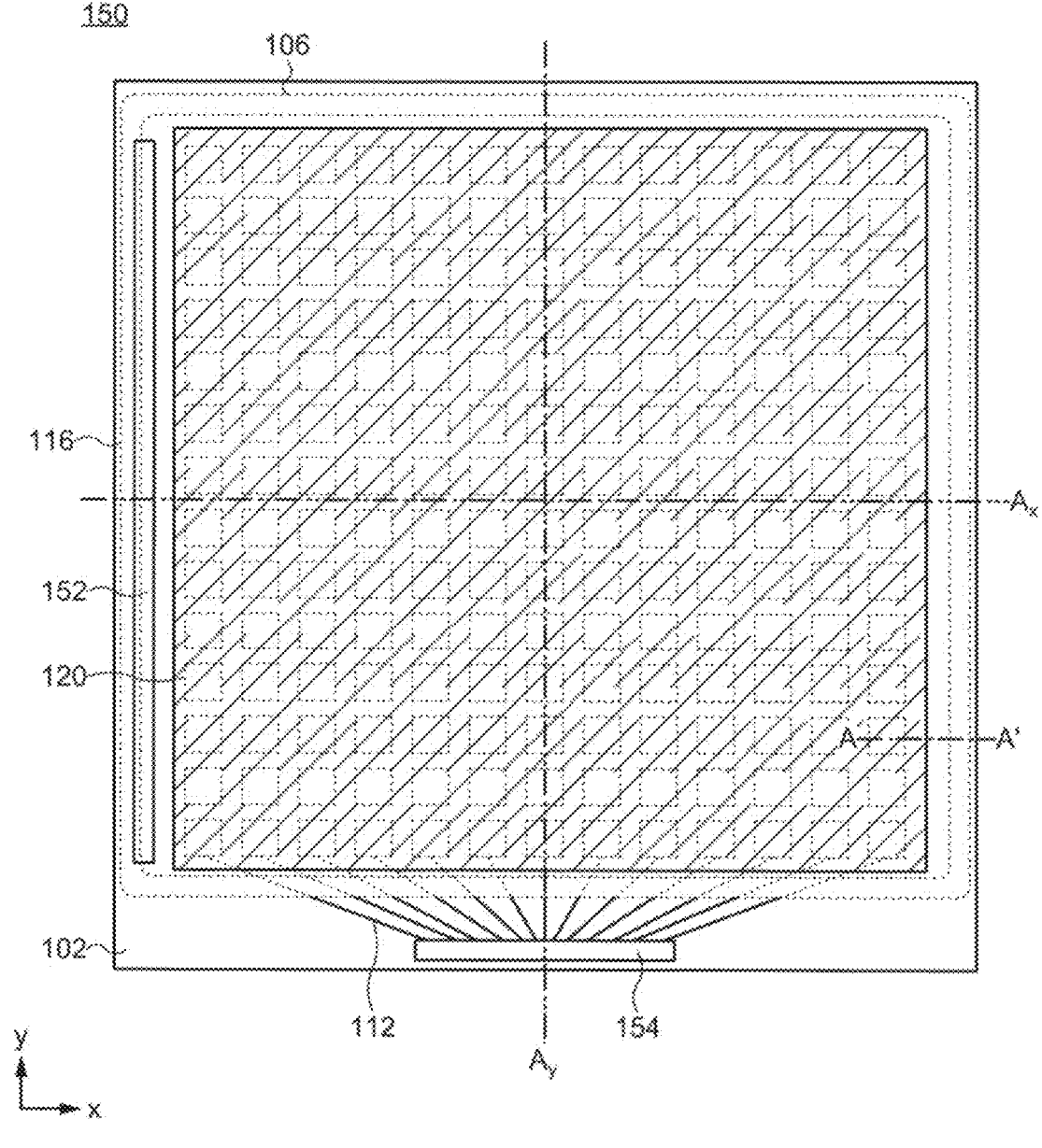
FIG. 10 is a schematic top view of an intelligent reflecting surface according to an embodiment of the present invention.
Figure 11:
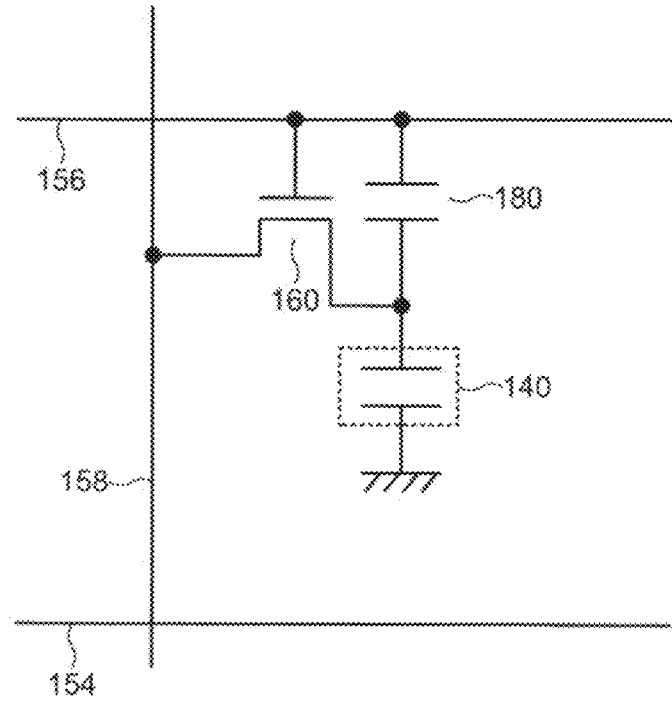
FIG. 11 is an example of an equivalent circuit of a reflecting element according to an embodiment of the present invention.

A schematic top view of the intelligent reflecting surface 150 is shown in FIG. 10, while an example of equivalent circuits of each reflecting element 120 is shown in FIG. 11. A difference of the intelligent reflecting surface 150 from the intelligent reflecting surface 150 is that the first electrodes 122 of the plurality of reflecting elements 120 are not conductive with each other but are independently controlled in the intelligent reflecting surface 150. Specifically, two driver circuits (gate-line driver circuit 152 and signal-line driver circuit 154) are provided over the substrate 102 to control the plurality of reflecting elements 120. A plurality of gate lines 156 extend in the row direction from the gate-line driver circuit 152, and the gate-line driver circuit 152 supplies gate signals to the plurality of reflecting elements 120 connected to each gate line 156. On the other hand, the signal-line driver circuit 154 is connected to a plurality of signal lines 158 extending in the column direction via the wirings 112 and supplies control potentials to the plurality of reflecting elements 120 connected to each signal line 158. Note that the gate-line driver circuit 152 and the signal-line driver circuit 154 may be fabricated by metal films, insulating films, and semiconductor films disposed over the substrate 102 or by mounting, over the substrate 102, an IC chip with an integrated circuit formed over a semiconductor substrate. There is no restriction on the number of gate-line driver circuits 152, and a pair of gate-line driver circuits 152 may be provided to sandwich the reflective plane, for example.

As shown in the example of the equivalent circuits in FIG. 11, each reflecting element 120 has at least one transistor 160, the gate line 156 is connected to its gate electrode, and the signal line 158 is connected to one terminal (first terminal). The other terminal (second terminal) of the transistor 160 is connected to the first electrode 122 for controlling the liquid crystal layer 140. Each reflecting element 120 may have a capacitive element 180 as an optional component between the gate line 156 and the second terminal of the transistor. Although not illustrated, the reflecting element 120 may further have additional transistors and capacitance elements.

Figure 12:
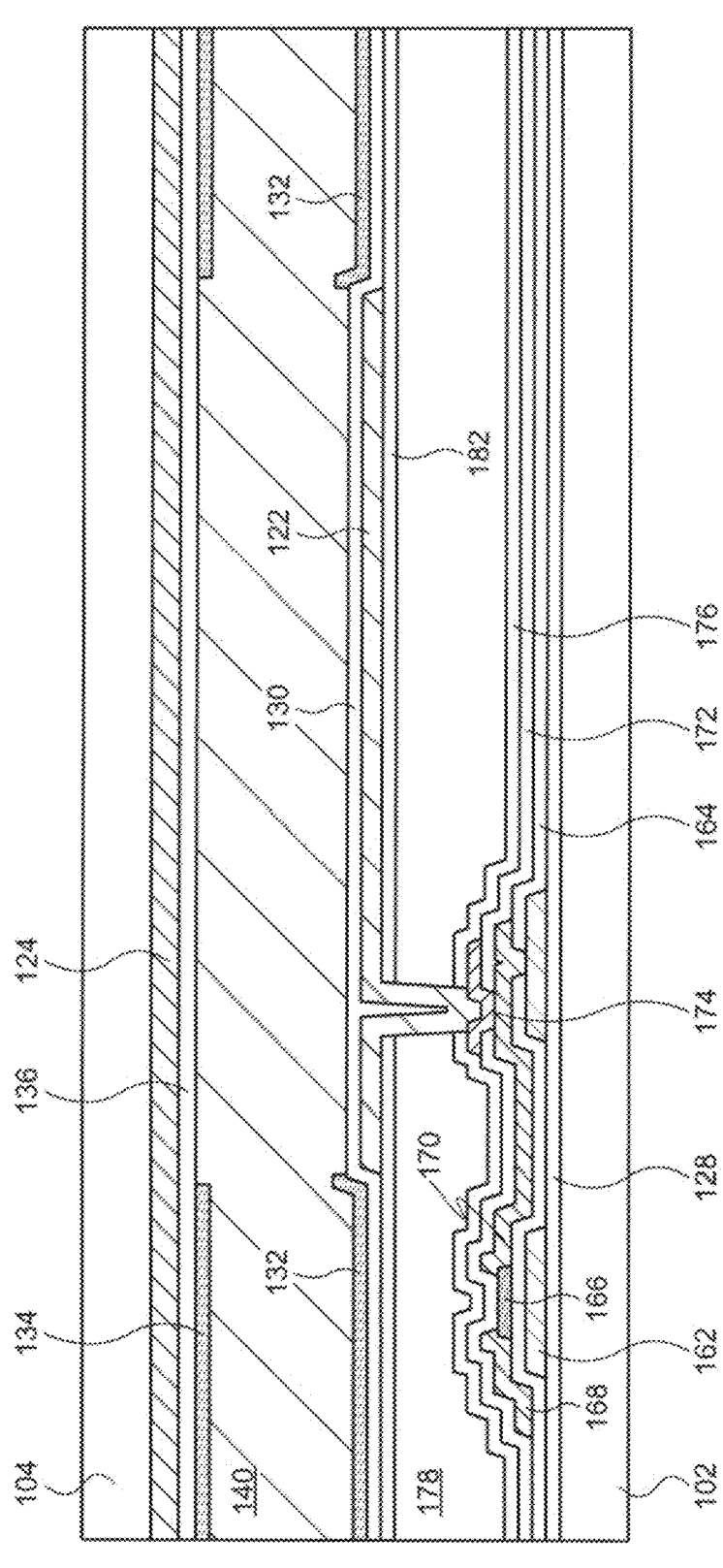
FIG. 12 is a schematic cross-sectional view of a reflecting element according to an embodiment of the present invention.

FIG. 12 shows a schematic cross-sectional view of one reflecting element 120. The transistor 160 is provided over the substrate 102 directly or through an undercoat 128. The transistor 160 illustrated in FIG. 12 is a so-called bottom-gate-type transistor and has a gate electrode 162, a gate insulating film 164 over the gate electrode 162, a semiconductor film 166 over the gate insulating film 164, and a first terminal 168 and a second terminal 170 over the semiconductor film 166. There is no restriction on the structure of the transistor 160, and the transistor 160 may be a top-gate-type transistor or a dual-gate-type transistor with gate electrodes 162 over and under the semiconductor film 166, respectively. There is also no restriction on the vertical relationship between the first terminal 168 and the semiconductor film 166 and between the second terminal 170 and the semiconductor film 166. The semiconductor film 166 may contain a group 14 element such as silicon or may be an oxide semiconductor such as indium-gallium oxide and indium-gallium-zinc oxide.

A first interlayer insulating film 172 composed of one or a plurality of films including silicon oxide or silicon nitride is provided over the first terminal 168 and the second terminal 170, and a conductive connection pad 174 is electrically connected to the second terminal 170 through an opening formed in the first interlayer insulating film 172. A planarization film 178 is provided over the connection pad 174 directly or through a second interlayer insulating film 176 to absorb unevenness caused by the transistor 160 and the like and provide a flat top surface. An opening is formed in the planarization film 178 and the second interlayer dielectric film 176 to expose the connection pad 174, and the first electrode 122 formed over the planarization film 178 is electrically connected to the connection pad 174 through this opening. As an optional component, a third interlayer insulating film 182 may be formed between the planarization film 178 and the first electrode 122.

In the intelligent reflecting surface 150, the second electrode 124 is also provided over the plurality of reflecting elements 120 and is supplied with a constant potential. On the other hand, the gate signal supplied to the gate line 156 operates the transistor 160, and the control potential is supplied from the signal line 158 to the first electrode 122 via the transistor 160 when the transistor 160 is on. As a result, an electric field based on the potential difference between the control potential and the constant potential applied to the second electrode 124 is applied to the liquid crystal layer 140. Accordingly, it is possible to independently supply arbitrarily set control potentials to the plurality of reflecting elements 120 by sequentially selecting the reflecting elements 120 row-by-row using the plurality of gate lines 156 and sequentially supplying the control potentials from the plurality of signal lines 158 to the selected reflecting elements 120. In other words, the dielectric constant of the liquid crystal layer 140 can be individually controlled in the plurality of reflecting elements 120. Therefore, unlike the intelligent reflecting surface 100, the intelligent reflecting surface 150 is able to function as a biaxial intelligent reflecting surface having two reflection axes $A_y$ and $A_x$ extending in the row direction and the column direction (y and x directions in FIG. 10, respectively).

The reflecting elements 120 described in the First Embodiment are also provided in the intelligent reflecting surface 150, and the high pre-tilt region and the low pre-tilt region are formed in each reflecting element 120. Therefore, the liquid crystal layer 140 in the low pre-tilt region, which contributes to the dielectric constant control, can be pseudo-bent-oriented in the absence of an electric field, and the liquid crystal layer 140 in the low pre-tilt region can be bent-oriented at a large response speed. This mechanism enables the intelligent reflecting surface 150 to function as an intelligent reflecting surface with a large response speed.

The aforementioned modes described as the embodiments of the present invention can be implemented by appropriately combining with each other as long as no contradiction is caused. Furthermore, any mode which is realized by persons ordinarily skilled in the art through the appropriate addition, deletion, or design change of elements or through the addition, deletion, or condition change of a process is included in the scope of the present invention as long as they possess the concept of the present invention.

It is understood that another effect different from that provided by each of the aforementioned embodiments is achieved by the present invention if the effect is obvious from the description in the specification or readily conceived by persons ordinarily skilled in the art.

What is claimed is:

1. A reflecting element comprising:

a first electrode;

a first orientation film over the first electrode;

a second orientation film over and in contact with the first orientation film;

a liquid crystal layer located over the first orientation film and the second orientation film and containing a liquid crystal molecule;

a third orientation film over the liquid crystal layer;

a fourth orientation film over and in contact with the liquid crystal layer and the third orientation film; and a second electrode over the fourth orientation film, wherein the first orientation film and the fourth orientation film are exposed from the second orientation film and the third orientation film, respectively, in a first region overlapping the first electrode, and each of the second orientation film and the third orientation film does not overlap the first electrode in a plan view.

2. The reflecting element according to claim 1, wherein the first orientation film and the fourth orientation film are in direct contact with the liquid crystal layer in the first region, the second orientation film is sandwiched by the first orientation film and the liquid crystal layer in a region other than the first region, and the third orientation film is sandwiched by the fourth orientation film and the liquid crystal layer in a region other than the first region.

3. The reflecting element according to claim 1, wherein the second orientation film and the third orientation film each have a first opening overlapping each other in a plan view.

4. The reflecting element according to claim 1, wherein the first electrode has a first opening, and the second orientation film and the third orientation film overlap the first opening in a plan view.

5. The reflecting element according to claim 4, wherein the second electrode overlaps the first opening in a plan view.

6. The reflecting element according to claim 4, wherein the second electrode has a second opening overlapping the first opening in a plan view.

7. The reflecting element according to claim 6, wherein the first opening and the second opening have the same shape.

8. An intelligent reflecting surface comprising a plurality of reflecting elements arranged in a matrix shape, each of the plurality of reflecting elements comprising:

a first electrode;

a first orientation film over the first electrode;

a second orientation film over and in contact with the first orientation film;

a liquid crystal layer located over the first orientation film and the second orientation film and containing a liquid crystal molecule;

a third orientation film over the liquid crystal layer;

a fourth orientation film over and in contact with the liquid crystal layer and the third orientation film; and a second electrode over the fourth orientation film, wherein the first orientation film and the fourth orientation film are exposed from the second orientation film and the third orientation film, respectively, in a first region overlapping the first electrode, and each of the second orientation film and the third orientation film does not overlap the first electrode.

9. The intelligent reflecting surface according to claim 8, wherein the first electrodes of two adjacent reflecting elements are electrically conductive with each other.

10. The intelligent reflecting surface according to claim 8, wherein each of the plurality of reflecting elements further includes a transistor electrically connected to the first electrode.

11. The intelligent reflecting surface according to claim 8, wherein the first orientation film and the fourth orientation film are in direct contact with the liquid crystal layer in the first region, the second orientation film is sandwiched by the first orientation film and the liquid crystal layer in a region other than the first region, and the third orientation film is sandwiched by the fourth orientation film and the liquid crystal layer in a region other than the first region.

12. The intelligent reflecting surface according to claim 8, wherein the second orientation film and the third orientation film each have a first opening overlapping each other in a plan view.

13. The intelligent reflecting surface according to claim 8, wherein the first electrode has a first opening, and the second orientation film and the third orientation film overlap the first opening in a plan view.

14. The intelligent reflecting surface according to claim 12, wherein the second electrode overlaps the first opening in a plan view.

15. The intelligent reflecting surface according to claim 12, wherein the second electrode has a second opening overlapping the first opening in a plan view.

16. The intelligent reflecting surface according to claim 15, wherein the first opening and the second opening have the same shape.

* * * * *